United States Patent [19]

Bricker et al.

[11] Patent Number: 4,955,130
[45] Date of Patent: Sep. 11, 1990

[54] FEEDER BLADE REPLACEMENT APPARATUS FOR COIL INSERTER TOOLING

[75] Inventors: Cedric L. Bricker, Fort Wayne; Timothy K. Pease, Kendallville; Donald L. Kammeyer, Woodburn, all of Ind.

[73] Assignee: Pease Windamatic Systems, Inc., Fort Wayne, Ind.

[21] Appl. No.: 471,641

[22] Filed: Jan. 29, 1990

[51] Int. Cl.$^5$ .................................. H02K 15/10
[52] U.S. Cl. .................................. 29/734; 29/596; 29/736
[58] Field of Search ............. 29/734, 736, 732, 564.1, 29/564.6, 596

[56] References Cited

U.S. PATENT DOCUMENTS 4,476,625 10/1984 Bricker et al. .................. 29/734

Primary Examiner—Carl E. Hall
Attorney, Agent, or Firm—Pearne, Gordon, McCoy & Granger

[57] ABSTRACT

A blade replacement technique for removing and replacing the wedge guide, coil feeder and/or pusher blades of coil inserter tooling is disclosed. The tooling includes a circular array of coil feeder blades and a circular array of wedge guide blades, with the wedge guide blades being in face-to-face apposition with the feeder blades and being radially outwardly of the feeder blades. A collet encircles the wedge guide blades and has a first surface restraining an intermediate portion of each wedge guide blade against axial and radial displacement and second surface facing and spaced from each wedge guide blade and defining a clearance zone. Each wedge guide blade is supported and restrained at its proximal end by being received in an annular groove in a support plate. Each coil feeder blade has its proximal end received in a slotted ring and each feeder blade is axially restrained by a pin projecting radially outwardly in each slot. By raising the collet, a selected wedge guide blade may be lifted out of the annular groove and pivoted in the clearance space so that an associated feeder blade may be released from its connecting pin and axially removed from the collet. The associated wedge guide blade may then be axially removed from the collet.

5 Claims, 5 Drawing Sheets

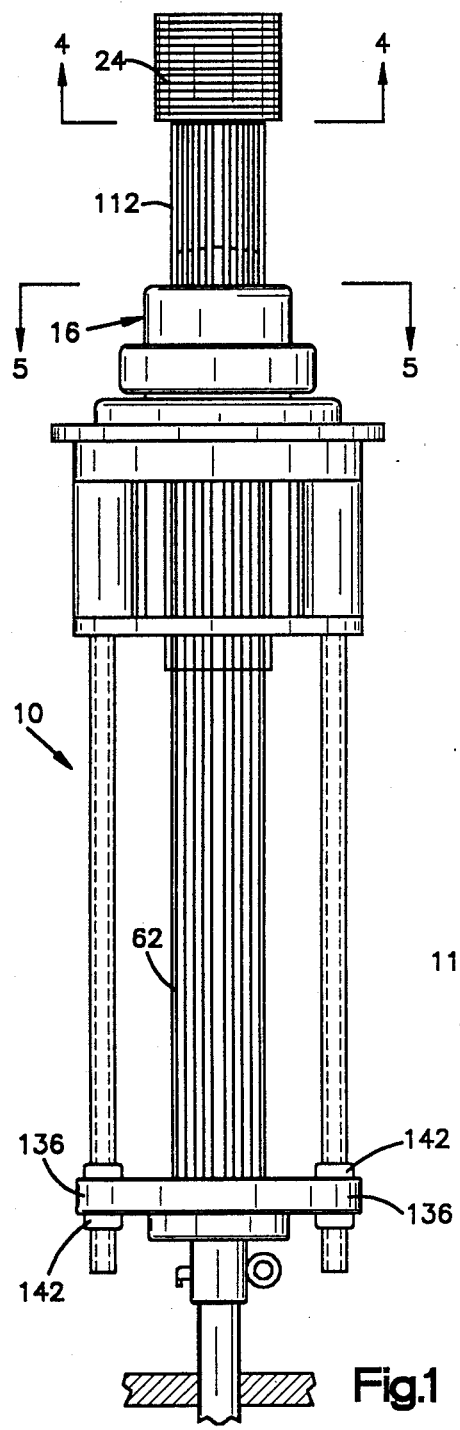
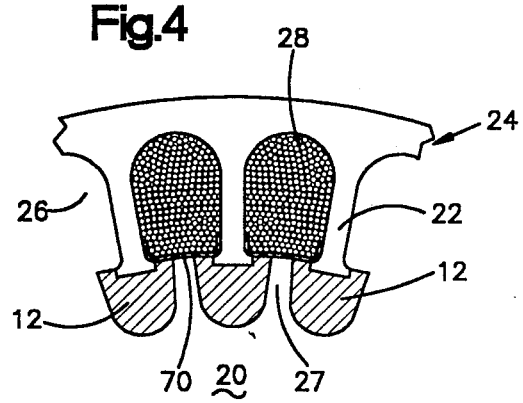
Fig.4
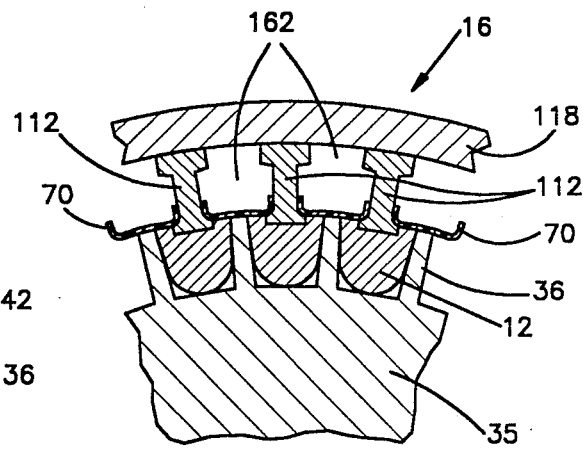
Fig.5
Fig.1

FEEDER BLADE REPLACEMENT APPARATUS FOR COIL INSERTER TOOLING

BACKGROUND OF THE INVENTION

This invention relates generally to apparatus for inserting prewound coils and slot wedges into the slots of an internally slotted core of a dynamoelectric machine. The invention is particularly concerned with an improved technique for disassembling a portion of the machine for replacement of the coil turn feeder blades, the wedge guide blades, and/or the wedge pusher blades.

In typical dynamoelectric machines, such as an electric motor, generator, alternator, or the like, the stator assembly comprises a generally cylindrical stack of laminations made from a magnetic material having a plurality of axially extending slots formed in the internal bore thereof. Electrical coils, or more specifically the side turn portions of electrical coils, are then inserted into the slots in various configurations to produce a desired magnetic field for operation of the device. Because the insulation on the conductors forming the electrical coils can be easily damaged during assembly and insertion, and because insertion of the coils into the proper slots is itself a difficult and exacting procedure, there have been developed a variety of complex precision machines for performing these operations. Such machinery includes apparatus for forming and inserting the coils, as well as for inserting the insulators and coil retaining wedges into the stator. Frequently, these machines are combined into a single assembly.

Representative of such machines are those disclosed in U.S. Pat. No. 3,722,063, issued to Richard B. Arnold, U.S. Pat. No. 3,829,953, issued to Richard E. Lauer et al.; U.S. Pat. No. 4,477,966, issued to Reinhard Napierski; U.S. Pat. No. 3,447,255, issued to Robert J. Eminger; U.S. Pat. No. 4,476,625, issued to Robert W. Bricker et al.; and U.S. Pat. No. 4,416,058, issued to Henry, Sr. et al.

A definite disadvantage in such prior art machines exists in the long, thin precision-machined elements, including coil turn feeder blades, wedge guide blades, and wedge pusher blades. In a typical arrangement, a slotted wedge magazine is automatically loaded from a separate machine or assembly which forms the wedges or insulators and inserts them into wedge-receiving slots of the magazine. In the course of loading the wedges into the magazine, the magazine is incrementally rotated or indexed. Subsequently, the wedge pusher blades move axially into the wedge-receiving slots of the magazine to force the wedges or insulators into the appropriate slots of the magnetic core. At this particular stage of operation of the machine, it is essential that the pusher blades be in precise alignment with the wedge-receiving slots of the magazine, the longitudinal passages defined by adjacent wedge guides, and the appropriate slots of the magnetic core. Any misalignment between the pusher blades and these elements can result in damage to, or even destruction of, the pusher blade assembly, the wedge guide blades and/or the coil turn feeder blades.

The problem of misalignment between the pusher blades and the wedge magazine is overcome in accordance with the disclosure of Bricker et al. U.S. Pat. No. 4,476,625, since the pusher blades are at all times received by the slots in the wedge magazine and rotate with the magazine during the wedge insertion sequence.

While the patent to Bricker et al. greatly reduced the possibility of damage to the pusher blades, conditions still exist which cause damage to the pusher blades and the other blades described above. These conditions include misalignment of the stator slots, accumulation of tolerances in the relatively movable parts of the machine, distortion of the blades themselves which can occur as a result of use and abuse, and incomplete cycling of the machine.

In some extreme instances, some of the pusher blades and a significant number of wedge guide blades and coil turn feeder blades may be destroyed, but in most instances only a few blades are damaged or destroyed and need to be replaced. In either case, however, it is necessary to disassemble that portion of the apparatus which includes the coil turn feeder blades and the wedge guide blades. This is particularly true if the teachings of the Bricker et al. patent are followed, since the wedge guide blades and the coil turn feeder blades are supported by a collet which radially embraces these elements. According to the construction of the Bricker et al. apparatus, the wedge guide blade retaining collet must be removed in order to remove the wedge guide blades and the radially adjacent coil turn feeder blades. Removal of the collet, however, leaves the entire wedge guide array radially unrestrained. After replacement of a blade, the entire wedge guide and coil turn feeder array must be carefully inspected to ensure that each blade is properly positioned in its proper place with respect to the wire stripper and various supporting notched rings.

A further complication according to prior art assemblies is that the wedge guides are also supported at their proximal ends by an adapter plate and an associated guide ring which necessitates the removal of these elements for removal of the coil turn feeder blades.

SUMMARY OF THE INVENTION

In its broader aspects, the present invention comprises an improvement in the mounting structure for the wedge guide blades and the coil turn feeder blades of wedge and coil inserting apparatus.

The apparatus includes a support and guide ring for the wedge guides and the wedge pusher blades, respectively, which has an annular groove therein for supporting the wedge guide blades. Each wedge guide blade is in contact with a coil turn feeder blade which, in turn, is pinned against axial movement by a dowel pin which extends radially outwardly from a notched ring and only partially into a coil turn feeder blade. A relatively large clearance space is provided between cylindrical portions of the adapter plate and the collet on the one hand and the wedge guide blades on the other hand. The collet may be raised slightly to permit selected wedge guide blades to be raised from a supporting annular groove and then moved radially outwardly so that a coil turn feeder blade may be then moved radially outwardly to be disengaged from its dowel pin and axially removed. After removal of the coil turn feeder blade, a radially adjacent wedge guide blade may be removed from the cylindrical array of blades.

BRIEF DESCRIPTION OF THE DRAWINGS

FIG. 1 is an elevational view of a coil and wedge inserting apparatus in accordance with the present invention;

FIG. 4 is a fragmentary, cross-sectional view, the plane of the section being indicated by the line 4—4 in FIG. 1;

FIG. 5 is a fragmentary, cross-sectional view, the plane of the section being indicated by the line 5—5 in FIG. 1.

DETAILED DESCRIPTION OF THE INVENTION

Figure 2A:
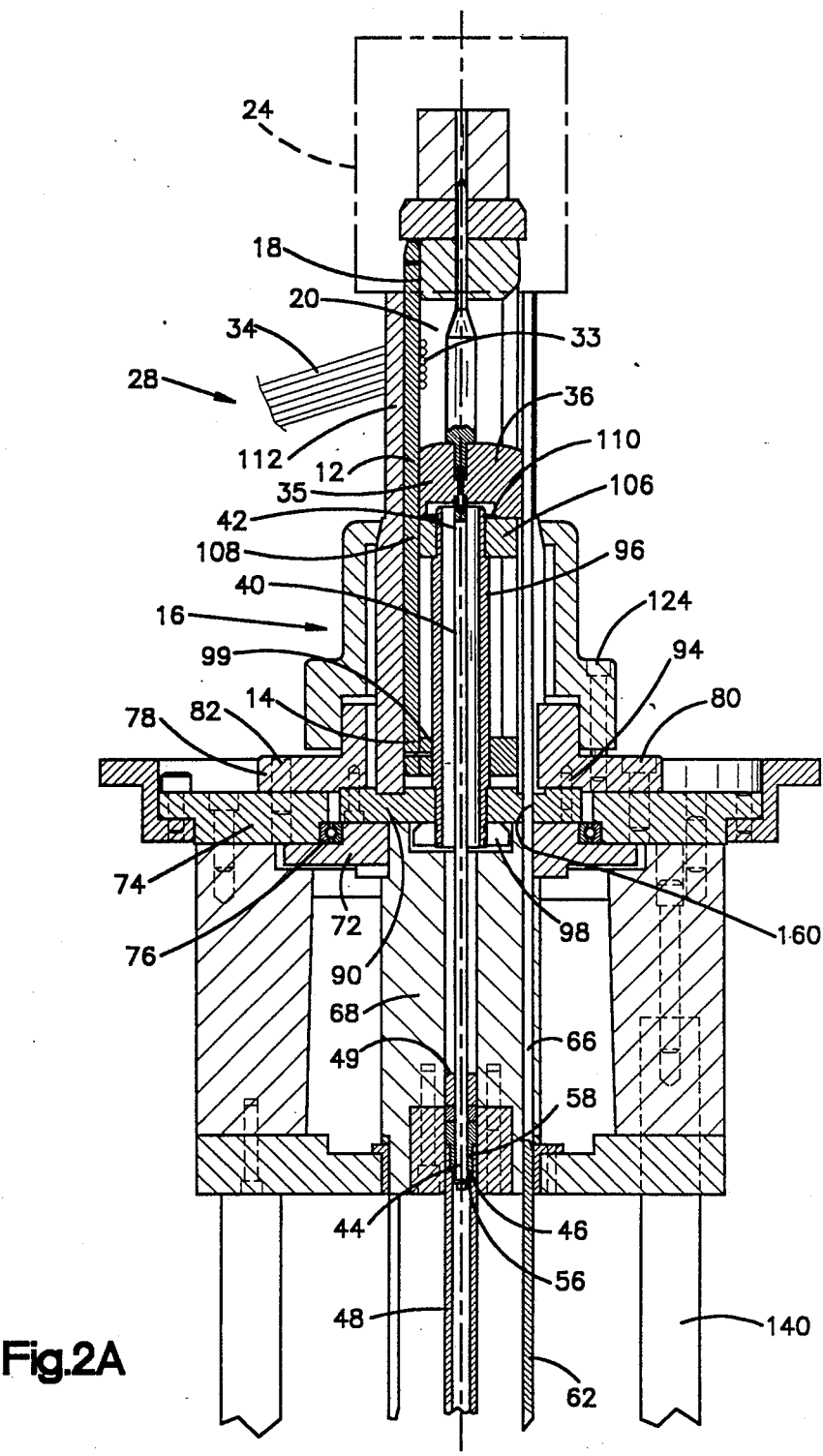
FIG. 2A is a fragmentary, axial cross-sectional view of the lower portion of a coil and wedge inserting apparatus incorporating the present invention.

Referring now to the drawings, there is illustrated an improved insulator wedge and coil inserting mechanism 10. The mechanism 10 includes a plurality of elongated coil turn feeder blades 12 having proximal ends 14 secured within a mounting assembly 16 and having distal ends 18 extending axially outwardly from the mounting assembly 16. The portions 18 are radially spaced apart to define a bore 20 and respectively engage teeth 22 (FIG. 4) of a stator core 24, which define winding slots 26 therebetween. Thus, axially extending spaces 27 between the distal portions 18 of the feeder elements 12 respectively communicate with the slots 26 of the core 24.

The stator core 24 is illustrated in FIG. 4 as having a plurality of coils or windings 28 positioned therein by the coil inserting apparatus of the present invention. Insulators or wedges 70 are positioned in the slots 26 over the windings 28 for electrically insulating the windings in the slots as is well known to those skilled in the art.

Figure 6:
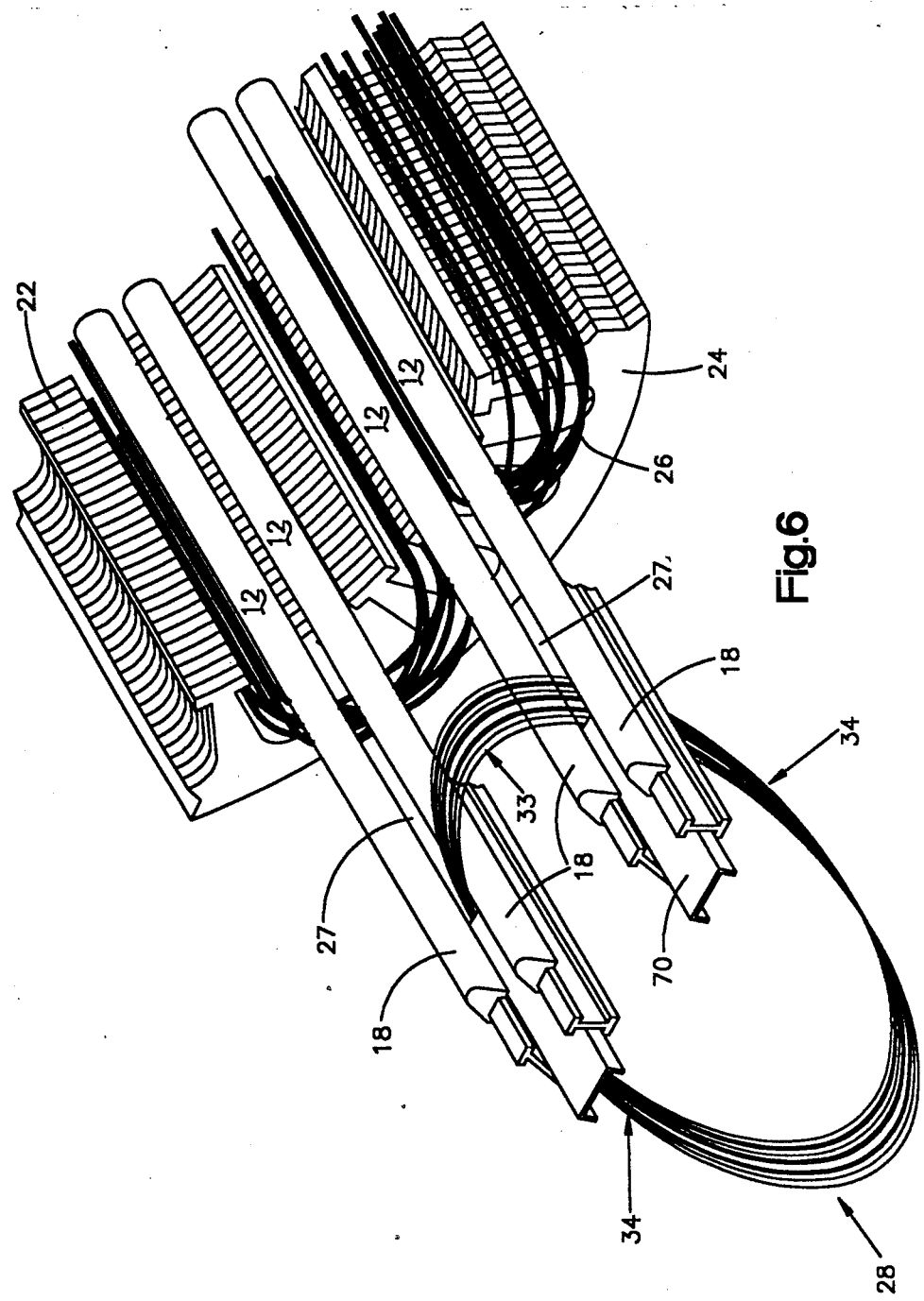
FIG. 6 is a fragmentary, perspective view, partly broken away, further showing a portion of the apparatus.

The distal portions 18 of the feeder blades 12 are adapted to receive prewound coils 28 to be inserted in the slots 26 of the core 24. The coils 28 are in skein form, as seen in FIG. 6. Each coil 28 has one end turn portion 33 extending across the bore 20 and its side portions 34 extending outwardly through the spaces 27 between respective pairs of the portions 18. It will be understood that the requisite number of prewound skein-type coils 28 are positioned on the feeder blades 12, following which the stator core 24 is positioned over the portions 18, as shown. Thus, the inner end turn portions 33 of the coils 28 are in axial alignment with the bore 20 of the core and the side portions 34 are in axial alignment with the respective pair of core member slots 26 which are in axial alignment with the respective spaces 27 between the portions 18, the side portions 34, however, extending outwardly and upwardly away from the slots 26 and the axis of the bore 20.

A stripper member 35 is provided mounted for axial movement in the bore 20 between a position beneath the stator core 24, as shown in solid lines in FIG. 2A, and a second extended position. The stripper member 35 has a plurality of projections 36 which respectively extend radially outwardly in the spaces 27 between the portions 18 of the feeder blades 12, as may be seen in FIG. 4. Axial movement of the stripper member 35 from the position shown in solid lines in FIG. 2A toward its extended position will move the end turn portions 33 of the coils 28 axially along the inner surface of the portions 18 and axially into the bore 20 of the core 24, with the side portions 34 which extend radially outwardly through the spaces 27 between the respective portions 18, thus progressively radially entering the respective core slots 26 so that, when the stripper member 35 reaches its extreme position, the side portions 34 are completely positioned in the respective slots 26.

The stripper 35 is driven by a sleeve 48 which is provided at one end with spacers 49. A rod 40 has one end 42 secured to the stripper 35 and has its other end 44 slidably received in an end 46 of a sleeve member 48.

The support 54 has a multiplicity of radial slots 60 which receive a corresponding multiplicity of wedge pusher blades 62. An end of each blade 62 is retained in its slot 60 by a blade holder ring 64. The blades 62 project from the support 54 partially into a multiplicity of slots 66 which are provided in the periphery of an insulating wedge magazine 68. As is well known in the art, the wedge magazine 68 is adapted to be incrementally indexed for sequential insertion of slot wedges 70 (FIG. 6) therein.

The wedge magazine 68 is indexed by means of a ratchet wheel 72 which is rotatably mounted with respect to a mounting plate 74 by a bearing 76.

An adapter plate 78 is fixed to the mounting plate 74 by threaded fasteners 80 and locating pins 82. In practice, the adapter plate 78 can be provided in any desired dimensions to accommodate wedge guide and coil turn feeder blades of various dimensions.

Figure 2B:
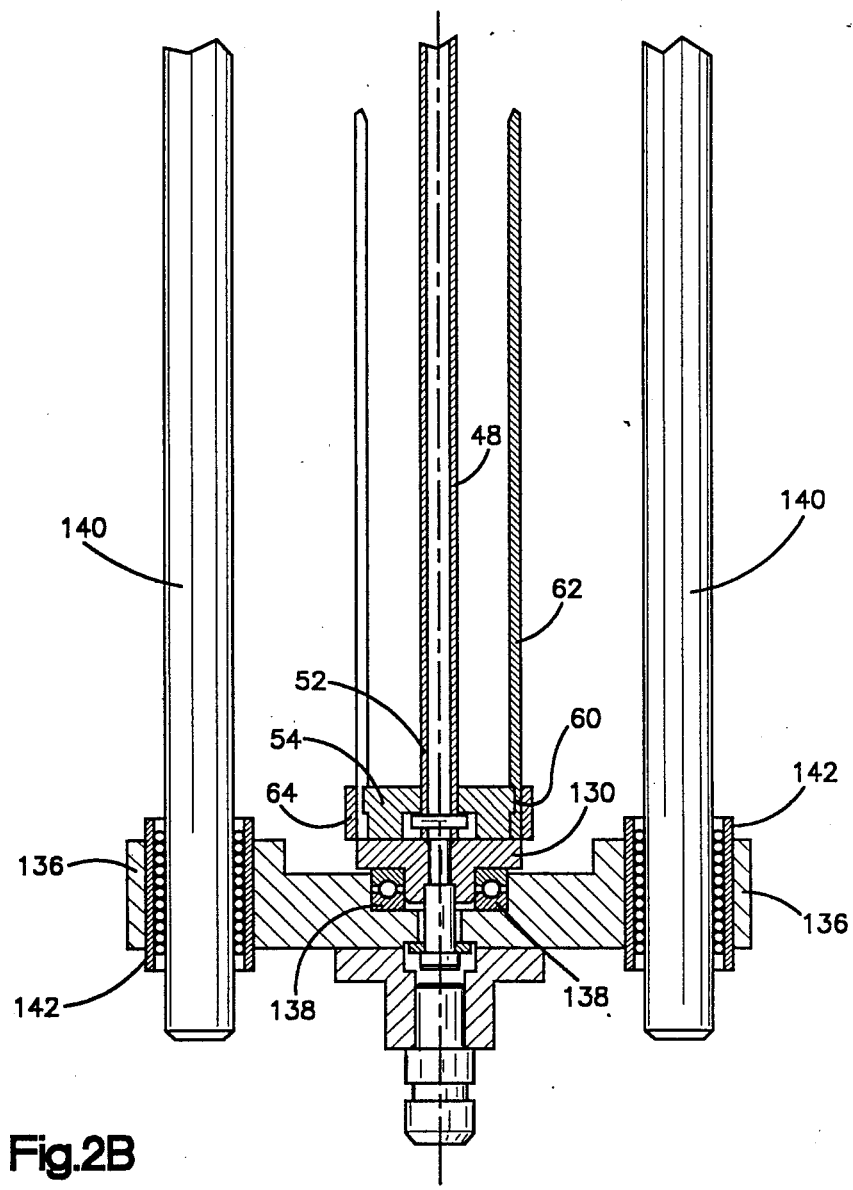
FIG. 2 is a fragmentary, axial cross-sectional view of the upper portion of a coil and wedge inserting apparatus incorporating the present invention.
Figure 3:
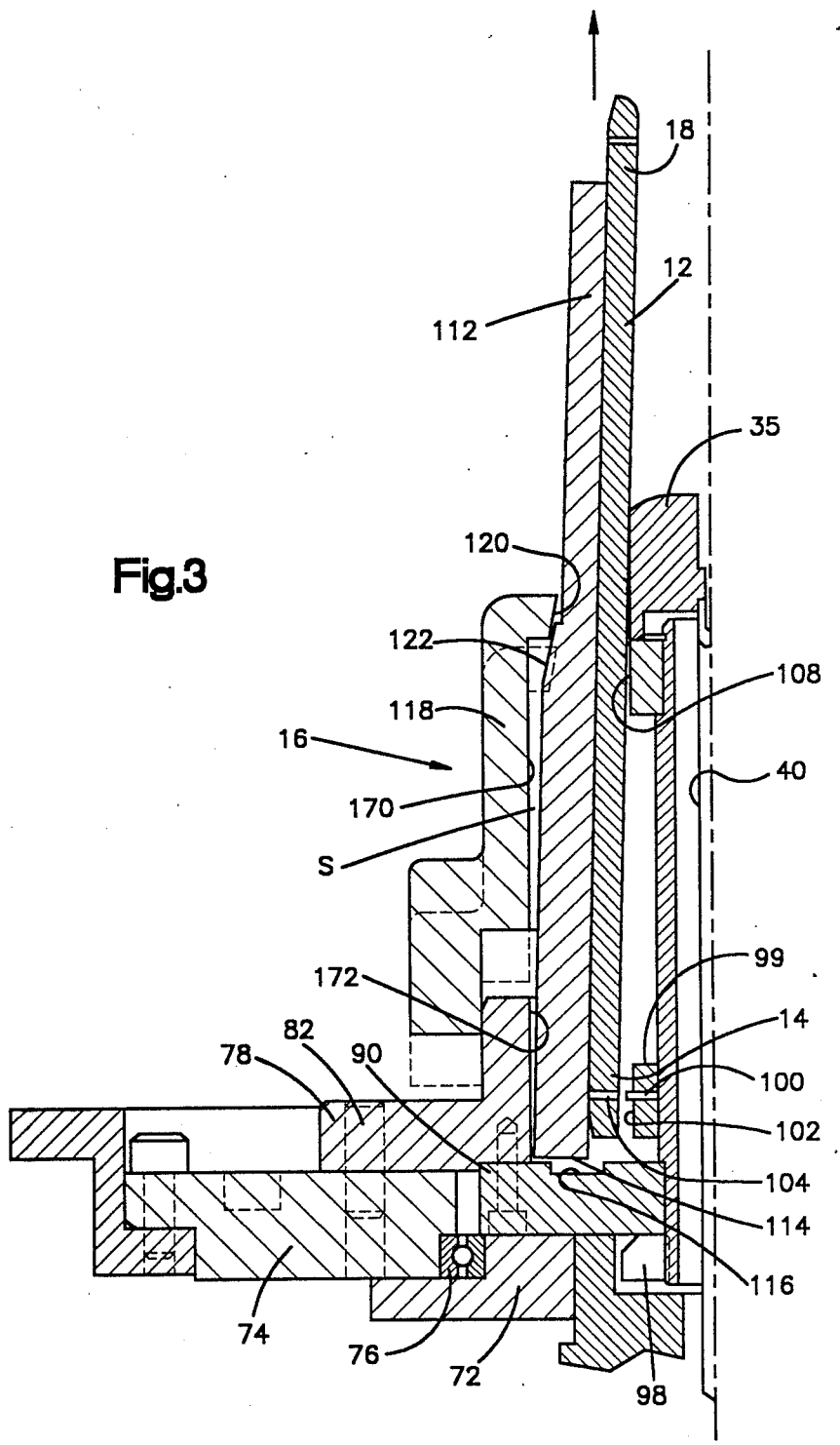
FIG. 3 is an enlarged, fragmentary view of a portion of the apparatus showing the collet in a slightly raised position and showing a coil pusher blade disengaged from its retaining pin for removal of the coil pusher blade from the apparatus.

As may be seen most clearly in FIG. 3, a support plate 90 is fixed to the mounting plate 78 by threaded fasteners 92 and pins 94 (FIG. 2). A mounting tube 96 is fixed to the support plate 90 by a nut 98 and the tube 96 surrounds the push rod 40.

The coil turn feeder blades 12 are mounted on an annular notched ring 99 by dowel pins 100 which project a relatively small distance into a notch 102 on the ring 99. Each coil turn feeder blade 12 has a cross-bore 104 which receives a pin 100. Each coil turn feeder blade 12 is also slidably received in and guided by another notched ring 106. The ring 106 is also provided with a plurality of notches 108 which are aligned with the notches 102 in the ring 99. The notched ring 106 is axially retained on the tube 96 by a snap ring 110, while the other notched ring 99 may be axially adjusted along the length of the tube 96 to adjust the extent to which the distal ends 18 of the blades 12 project beyond the ends of wedge guide blades 112 to accommodate stator cores of varying axial extent.

A circular array of wedge guide blades 112 is in radial face-to-face apposition with its own one of the arrays of coil turn feeder blades 12. This arrangement may be most clearly seen in FIGS. 5 and 6.

Referring again to FIG. 3, it may be noted that each wedge guide blade has an end 114 which is normally constrained against radial displacement by being received within an annular groove 116 in the support plate 90. Each end 114, and therefore each wedge guide blade 112, is constrained against axial movement by the mounting assembly 16, which includes a collet 118. The collet 118 has a conical surface 120 which engages a cooperating conical surface 122 provided on each wedge guide blade 112. Since the collet 118 is clamped to the mounting plate 78 by threaded fasteners 124, each wedge guide blade 112 is normally restrained against axial and radial displacement by the collet 118 and by being received within the annular groove 116 in the support plate 90.

Referring again to FIG. 2B, it may be seen that the wedge pusher blade support 54 is attached to a bearing plate 130 by means of suitable threaded fasteners and dowel pins (not shown). The bearing plate is rotatably mounted on a base plate 136 by a bearing 138, since the wedge pusher blades 62 are received in the magazine 68 and must rotate therewith and relative to the sleeve 48. The base plate 136 is slidably mounted on a pair of elongated guide shafts 140 by linear bearings 142 so that the assembly, which includes the base plate 136, the wedge pusher blades 62, and the sleeve 48, may be advanced axially by a prime mover (not shown).

Initially, with the apparatus loaded with slot wedges 70 and coils 28, and the appropriate stator stack 24, the machine commences its insertion sequence. The prime mover (not shown) moves the sleeve 48 and the wedge pusher blades 62 upwardly, as shown in the drawings. During this sequence of the operation, the shaft 40 and the associated stripper 35 remain stationary. Also, during this operation, the rod 40 is telescoped within the sleeve 48.

The wedge inserter blades 62 engage the slot wedges 70 positioned in the slots 66 of the magazine 68 and push the slot wedges 70 through a multiplicity of passages 160 which are provided in the mounting plate 90. As the slot wedges 70 are pushed upwardly, they enter spaces 162 between adjacent wedge guide blades 112. When the spacers 49 engage the stripper 35, the stripper 35 is then advanced to engage the end turn portion 33 of the coils 28 to advance the portions 33 along the coil turn feeder blades 18 and into the respective coil slots 26 just ahead of the advancement of the slot wedges 70. Thus, each side portion 34 of the coil 28 is positioned in its slot in the core stack and is covered by a slot wedge 70.

During the operating sequence of the apparatus, it is not uncommon that the wedge pusher blades, the wedge guide blades, and/or the coil turn feeder blades are damaged and must be replaced. Also, normal wear and tear on these elements necessitate periodic replacement. According to prior art practices, it is necessary to disassemble major portions of the apparatus to replace these members, resulting in a considerable amount of down-time for the machine.

According to the present invention, these elements are removed in a manner which will now be explained.

In FIG. 3, it may be noted that there is provided a radial space S between the outer face of each wedge guide blade 112 and inner cylindrical surfaces 170 and 172 of the collet 118 and the adapter plate 78, respectively. To remove one or more coil turn feeder blades 12, the threaded fasteners 124 are loosened and the collet 118 is raised from its phantom outline position to its solid outline position illustrated in FIG. 3, to separate the surfaces 120 and 122, so that the end 114 of the wedge guide blade 112 may be raised from the annular groove 116 and tilted to the position shown in that figure. After the tilting operation of the wedge guide blade 112, the coil turn feeder blade 12 may be similarly tilted, as shown in FIG. 3, to release the connection between the pin 100 and the bore 104. The coil turn feeder blade may then be axially removed from the assembly by pulling the blade in the direction of the arrow, as shown in FIG. 3. After removal of the blade 12, the wedge guide blade 112 may be moved radially inwardly and then axially removed from the assembly in a like manner.

After removal of the blades 12 and 112, a wedge pusher blade which cooperates with a removed wedge guide blade 112 may be removed from advancing the wedge pusher blades upwardly in the previously described manner and releasing that cooperating blade from its connection with the member 60. To reinstall one of these elements in the machine, the steps involved in the above procedure are reversed. It should be noted that while the positioning of the dowel pin 100 in its bore 104 is done blindly, the slot 102 laterally guides the coil turn feeder blade 112 so that one may feel the dowel pin 100 engaging the bore 104 on slight axial movement of the feeder blade 12.

Although the preferred embodiment of this invention has been shown and described, it should be understood that various modifications and rearrangements of the parts may be resorted to without departing from the scope of the invention as disclosed and claimed herein.

What is claimed is:

1. In an apparatus for inserting coil side portions and coil side retaining wedges into axially extending slots of a magnetic core and including a circular array of coil turn feeder blades for receiving a plurality of electrical coils into said slots, stripper means for moving said coils from said coil blades into said core in positions with side turn portions thereof disposed in said slots, a circular array of wedge guide blades for guiding a plurality of slot wedges into said slots to cover said side turn portions in said slots, each slot wedge being guided between circumferentially adjacent wedge guide blades and each coil turn feeder blade being radially inwardly of and in face-to-face radial apposition with its own one of said wedge guide blades in said circular array, in combination therewith the improvement comprising support ring means including detent means for retaining each feeder blade against axial movement relative to said support ring means when said feeder blade is in an operating position, means for retaining each wedge guide blade in said face-to-face radial apposition with its own one of said coil turn feeder blades to thereby prevent disengagement of said detent means, said means for retaining including means for supporting and restraining one end of each wedge guide blade against radial displacement and including collet means having a first surface for restraining an intermediate portion of each wedge guide blade against axial and radial displacement, said collet means having a second surface facing and spaced from each wedge guide blade and defining a clearance zone, releasable fastening means holding said first surface of said collet means in contact with said intermediate portion, whereby said feeder blades and said guide blades may be removed and replaced by releasing said fastening means, moving said first surface of said collet means out of contact with said intermediate portion, axially and then radially displacing said one end of a wedge guide blade within said clearance zone, radially displacing a feeder blade to release said detent means from its axially retaining condition and axially removing the said feeder blade from said circular array of feeder blades.

2. The apparatus according to claim 1, wherein said support ring means includes a multiplicity of notches which receive said coil turn feeder blades and wherein said detent means comprises a dowel pin positioned in each notch and extending into a bore in each feeder blade.

3. The apparatus according to claim 2, wherein each dowel pin extends into said bore a distance which is less than the space between said second surface and a wedge guide blade received in said notch.

4. The apparatus according to claim 3, wherein said means for supporting and restraining one end of each wedge guide blade against radial displacement includes support plate means having an annular groove therein which receives said one end.

5. The apparatus according to claim 4, wherein said first surface of said collet comprises a conical surface and wherein said second surface of said collet means comprises a cylindrical surface.

* * * * *